(12) United States Patent
McCombs et al.

(10) Patent No.: US 6,558,451 B2
(45) Date of Patent: May 6, 2003

(54) MULTIPLE BED PRESSURE SWING ADSORPTION METHOD AND APPARATUS

(75) Inventors: Norman R. McCombs, Tonawanda, NY (US); Robert E. Casey, Buffalo, NY (US)

(73) Assignee: AirSep Corporation, Buffalo, NY (US)

( * ) Notice: Subject to any disclaimer, the term of this patent is extended or adjusted under 35 U.S.C. 154(b) by 0 days.

(21) Appl. No.: 09/851,750

(22) Filed: May 9, 2001

(65) Prior Publication Data

US 2002/0029691 A1 Mar. 14, 2002

Related U.S. Application Data

(60) Provisional application No. 60/202,898, filed on May 10, 2000.

(51) Int. Cl.[7] .............................................. B01D 53/047
(52) U.S. Cl. ................................. 95/98; 95/130; 96/130; 96/144
(58) Field of Search ........................ 95/96–98, 100–105, 95/130; 96/130, 143, 144

(56) References Cited

U.S. PATENT DOCUMENTS

| | | | | | |
|---|---|---|---|---|---|
| 3,237,377 | A | * | 3/1966 | Skarstorm | 95/130 X |
| 3,564,816 | A | * | 2/1971 | Batta | |
| 3,636,679 | A | * | 1/1972 | Batta | |
| 3,717,974 | A | * | 2/1973 | Batta | |
| 3,797,201 | A | * | 3/1974 | Tamura | 95/130 X |
| 4,013,429 | A | * | 3/1977 | Sircar et al. | 95/130 X |
| 4,021,210 | A | * | 5/1977 | Streich et al. | 95/130 X |
| 4,160,651 | A | * | 7/1979 | Pivard | 95/97 |
| 4,194,890 | A | * | 3/1980 | McCombs et al. | 95/98 X |
| 4,512,780 | A | * | 4/1985 | Fuderer | 95/130 X |
| 4,515,605 | A | * | 5/1985 | Inoue et al. | 95/130 X |
| 4,589,888 | A | * | 5/1986 | Hiscock et al. | 95/130 X |
| 4,599,094 | A | * | 7/1986 | Werner et al. | 95/130 X |
| 4,648,888 | A | * | 3/1987 | Rowland | 95/130 X |
| 4,684,377 | A | * | 8/1987 | Haruna et al. | 95/130 X |
| 4,781,735 | A | * | 11/1988 | Tagawa et al. | 95/130 X |
| 4,802,899 | A | * | 2/1989 | Vrana et al. | |
| 5,110,569 | A | * | 5/1992 | Jain | 95/97 X |
| 5,232,474 | A | * | 8/1993 | Jain | 95/97 |
| 5,328,503 | A | * | 7/1994 | Kumar et al. | 95/130 X |
| 5,411,578 | A | * | 5/1995 | Watson et al. | 95/130 X |
| 5,531,807 | A | * | 7/1996 | McCombs et al. | 95/26 |
| 5,540,758 | A | * | 7/1996 | Agrawal et al. | 95/130 X |
| 5,571,309 | A | * | 11/1996 | Kumar | 95/105 X |
| 5,656,065 | A | * | 8/1997 | Kalbassi et al. | 95/105 X |
| 5,656,067 | A | * | 8/1997 | Watson et al. | 95/130 X |
| 5,846,294 | A | * | 12/1998 | Doong | 95/130 X |
| 5,871,564 | A | * | 2/1999 | McCombs | 95/98 |
| 5,906,674 | A | * | 5/1999 | Tan et al. | 95/130 X |
| 6,048,384 | A | * | 4/2000 | Smolarek | 95/130 X |

* cited by examiner

*Primary Examiner*—Robert H. Spitzer
(74) *Attorney, Agent, or Firm*—Ronald S. Kareken, Esq.; Jaeckle Fleischmann & Mugel, LLP

(57) ABSTRACT

A compact multiple bed pressure swing adsorption apparatus to produce a high concentration of oxygen efficiently and at minimum noise levels by using inactive pressurized adsorber beds to purge adsorbed nitrogen.

14 Claims, 7 Drawing Sheets

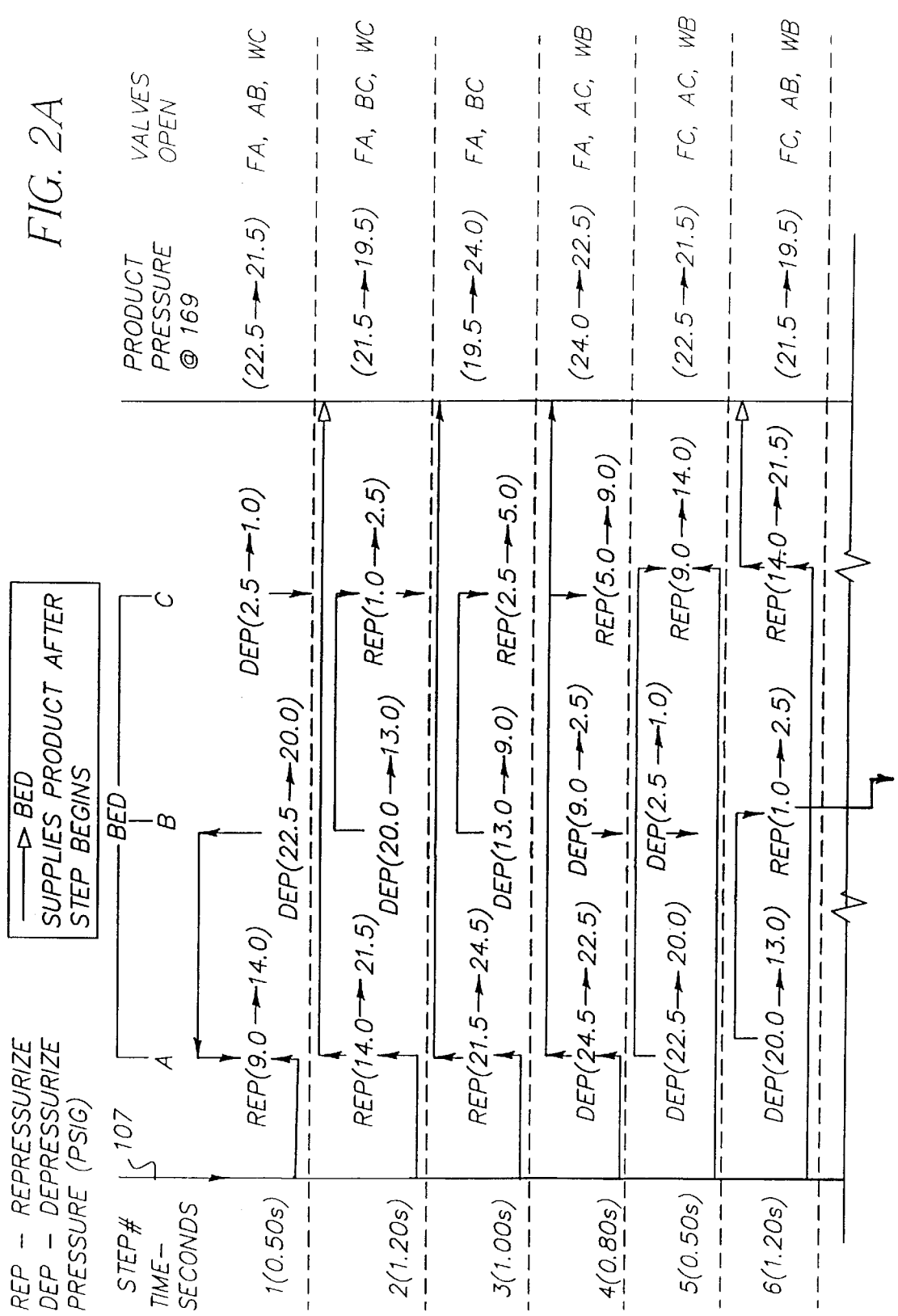

VALVE DESIGNATIONS
116a = FA
116b = FB
116c = FC
120a = WA
120b = WB
120c = WC
136ab = AB
136ac = AC
136bc = BC

MULTIPLE BED PRESSURE SWING ADSORPTION METHOD AND APPARATUS

This invention relates generally to gas concentrator apparatus for separating gas mixtures by pressure swing adsorption ("PSA") and more particularly to apparatus for the efficient and quiet production of oxygen for various industrial, commercial and/or medical purposes. Priority is claimed in co-pending provisional patent application No. 60/202,898, filed May 10, 2000.

BACKGROUND OF THE INVENTION

The general type and operating principles of PSA, or pressure swing adsorption, apparatus with which this invention is concerned are described in U.S. Pat. Nos. 3,564,816; 3,636,679; 3,717,974; 4,802,899; 5,531,807 and 5,871,564, among others. For example, a pressure swing adsorption apparatus may include two or more adsorbers, each having a fixed sieve bed of adsorbent material to fractionate at least one constituent gas from a gaseous mixture by adsorption into the bed, when the gaseous mixture from a feed stream is sequentially directed through the adsorbers in a co-current direction. While one adsorber performs adsorption, another adsorber is simultaneously purged of its adsorbed constituent gas by part of the product gas that is withdrawn from the first or producing adsorber and directed through the other adsorber in a counter-current direction. Once the other adsorber is purged, the feed stream at a preset time is then directed to the other adsorber in the co-current direction, so that the other adsorber performs adsorption. The first adsorber then is purged either simultaneously, or in another timed sequence if there are more than two adsorbers, all of which will be understood from a reading of the above described patents.

When, for example, such apparatus is used to produce a high concentration of oxygen from ambient air for use in various applications, whether medical, industrial or commercial, air which enters the apparatus typically contains about 78% nitrogen, 21% oxygen, 0.9% argon, and a variable amount of water vapor. Principally, most of the nitrogen is removed by the apparatus to produce a gas product, which for medical purposes, for example, typically may contain at least about 80% oxygen.

SUMMARY OF THE INVENTION

The present invention provides a new and improved pressure swing adsorption ("PSA" or "oxygen concentrator") apparatus, and especially the method of operating the apparatus, that can attain the required concentrations of oxygen for the desired application(s), yet be more productive, more energy efficient and quieter in operation than known multiple bed systems. This is accomplished at least in part by our inventive multiple bed PSA apparatus not exceeding three beds, and an operating cycle that includes operational steps in which beds are purged principally by gases from a then non-producing or "inactive" bed, rather than the useful product gas generated by the then producing "active" bed.

BRIEF DESCRIPTION OF THE DRAWING

The foregoing and other objects, features and advantages of the invention will become more apparent from a reading of the following description in connection with the accompanying drawing of a preferred embodiment of the invention, in which:

FIGS. 2, 2A and 2B comprise a chart illustrating the sequence and timing of the steps for operating a PSA apparatus according to the invention;

DETAILED DESCRIPTION OF THE PREFERRED EMBODIMENT

Figure 1:
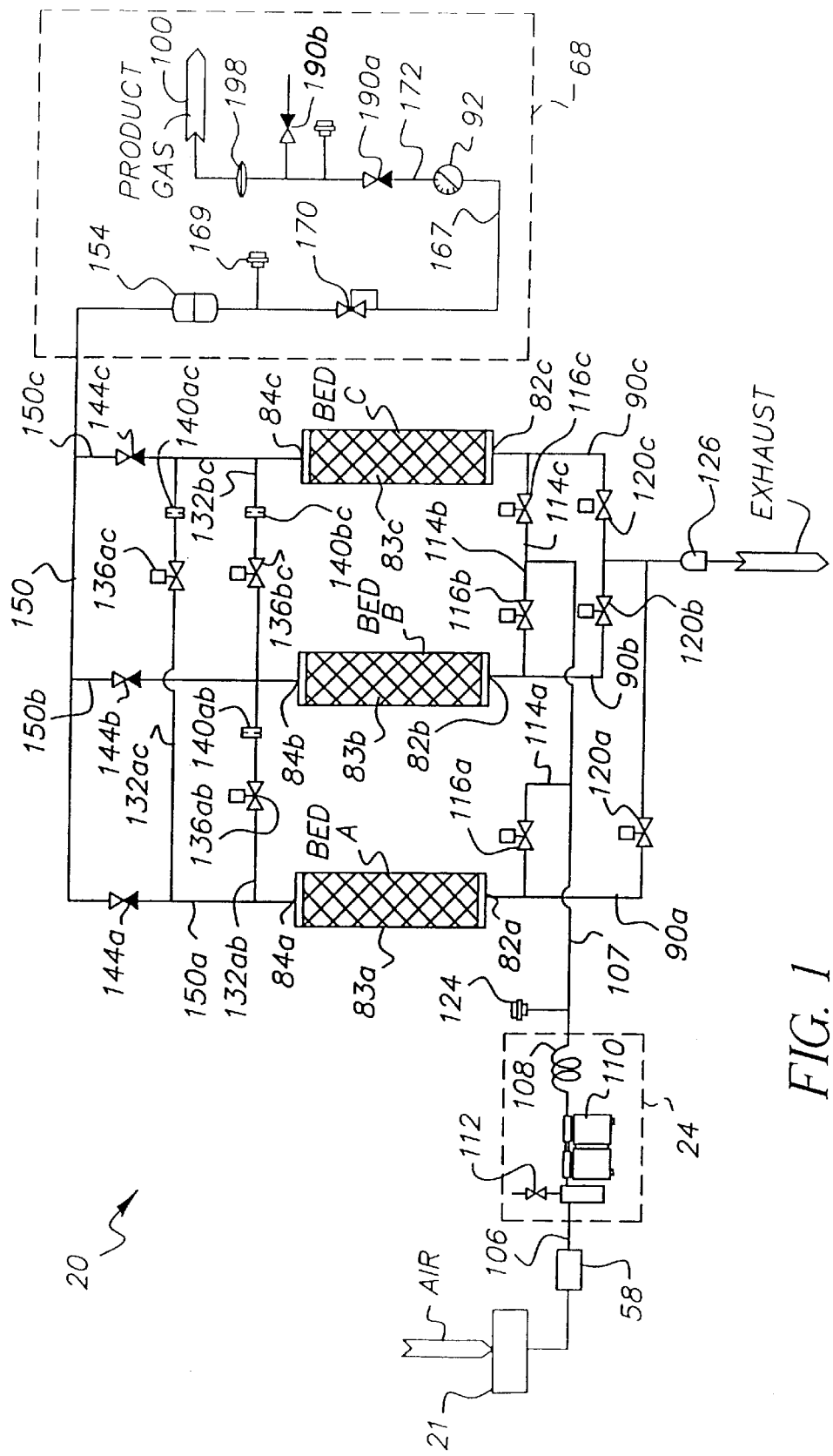
FIG. 1 is a schematic illustration of a PSA apparatus according to the invention.

Turning now to the drawing and in accordance with the present invention, there is shown in FIG. 1 an embodiment, generally indicated as 20, of a pressure swing adsorption, or PSA, apparatus used for fractionating at least one component, namely nitrogen, from a gaseous mixture, generally but not necessarily ambient air, by pressure swing adsorption. The gaseous air mixture labeled "AIR" is supplied to the apparatus 20 through a particle and vapor filter 21 of an intake resonator 58 to decrease the noise for the intake of the feed stream. From resonator 58, the feed stream continues through fluid line 106 by means of a pump or compressor assembly 24. Compressor assembly 24 containing electrically powered compressor 110, heat exchanger 108, and pressure relief valve 112 selectively moves the feed stream through fluid line 107 which is branched to direct the feed stream alternately and sequentially through three input lines 114a, 114b and 114c, respectively, by the sequential operation of corresponding feed valves 116a, 116b and 116c.

If, for example, feed valve 116a is open, the feed stream enters an inlet 82a of a first adsorber A in a "co-current" direction, which in FIG. 1 is the upward direction. While passing through a sieve bed 83a contained in adsorber A, the feed stream is fractionated into the desired concentration of product gas by virtue of the substantial portion of nitrogen in the feed stream having been adsorbed by the sieve bed 83a, while the balance of the feed stream, consisting, for example, of about 95% oxygen proceeds as product gas through outlet 84a of first adsorber A. As described in this specification, an adsorber, while it is producing the product gas for delivery to a user of the apparatus, is referred to as the "active" bed whereas each other bed is referred to as an "inactive" bed.

When the internal pressure in adsorber A is at a sufficiently high level, the substantial volume of the product gas exiting adsorber A is then directed through line 150a and a common product supply line 150 to a flow control assembly 68, to be described, to constitute part of the usable product gas available to the user. A check valve 144a is positioned in line 150 to prevent the back flow of product gas from control assembly 68 to adsorber A. Corresponding check valves 144b and 144c are also provided to prevent back flow into adsorbers B and C. The check valves 144a, 144b and 144c are also important because they assist in delaying the delivery of product gas from their respective adsorbers to supply line 150 until the output pressure of the respective adsorber is at least as high as the line pressure, thereby operating the adsorber beds at higher and more efficient pressures.

While adsorber A is functioning as the active bed, adsorber B is an inactive bed but is still pressurized from having been the active bed prior to adsorber A. According to the invention, a purge control valve 136*bc* is opened to release the pressurized gas in the inactive adsorber B to flow through the corresponding diverter line 132*bc* and in a countercurrent direction through outlet 84*c* of inactive adsorber bed C both to complete purging and to begin repressurization of absorber C, the purging of which had begun immediately prior to adsorber A having become the active adsorber.

At the end of the portion of the operating cycle in which adsorber A is the active bed, a portion of the product gas produced by adsorber A also is diverted to inactive adsorber C through diverter line 132*ac* by opening purge control valve 136*ac,* in order to continue pressurization of adsorber C. At the same time sequence, purge control valve 136*bc* is closed and a discharge valve 120*b* is opened in order to cause the remaining pressure in adsorber B to discharge its adsorbed nitrogen by exiting inlet 82*b* and to be discharged through line 90*b,* as shown in FIG. 1 as EXHAUST, to the atmosphere through a suitable sound muffler or silencer 126.

Similarly, depending on the sequence of valve openings as controlled by a suitable micro-controller (not shown), the adsorber beds C and B in sequence become the active beds to produce product gas in sieve beds 83*c* and 83*b* by the sequential opening of the corresponding feed valves 116*c* and 116*b* in lines 114*c* and 114*b,* respectively, and the process repeated in the sequence and for the cycle as will be described.

Figure 5:
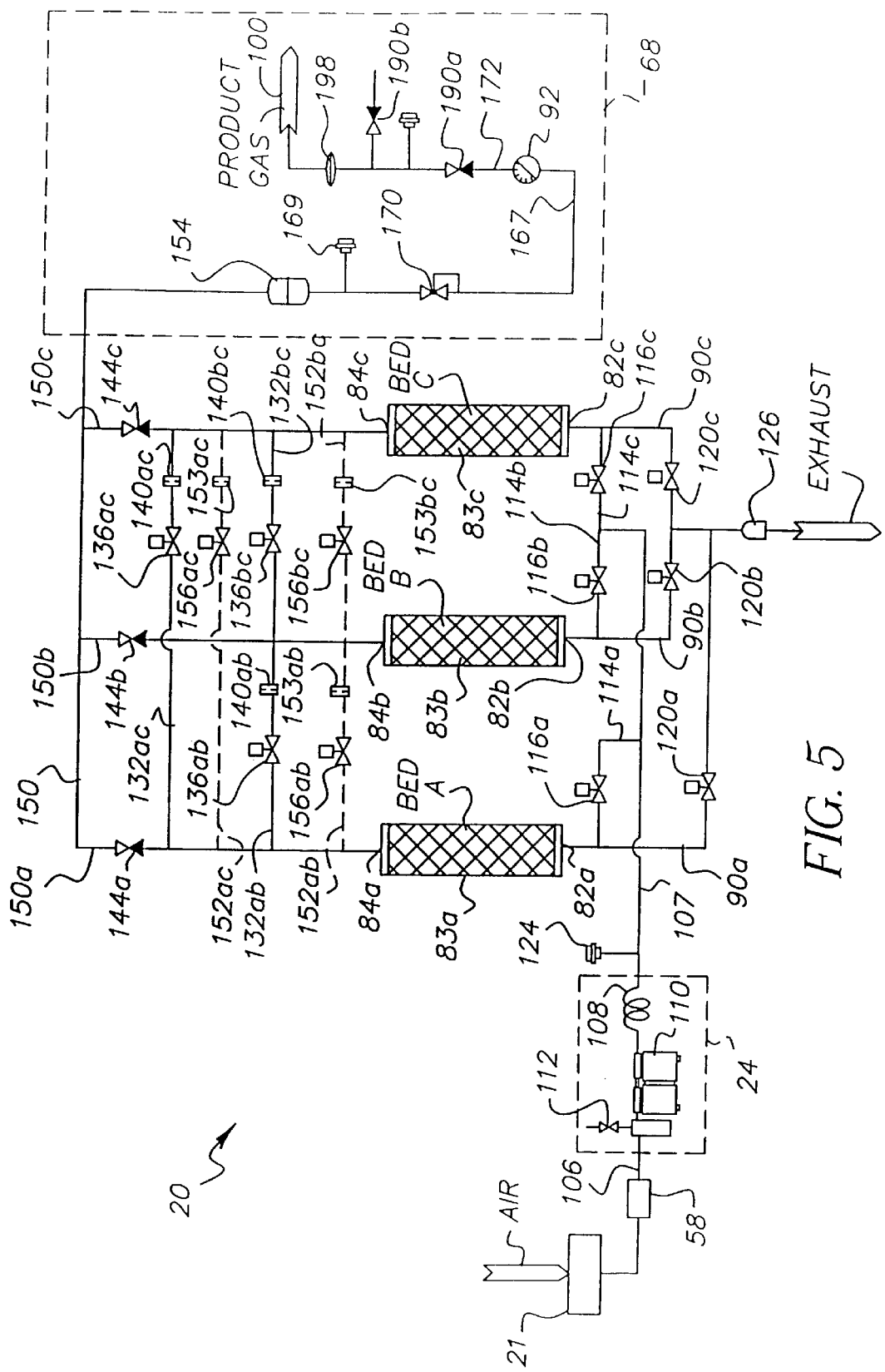
FIG. 5 is a schematic illustration of a second embodiment of the invention and including optional product gas diverter lines to optimize both the purge and the pressure equalization functions.

To control the volume of diverted product gas flowing through lines 132, there are provided corresponding purge orifices 140*ab,* 140*ac* and 140*bc* having openings that can be adjusted in size to fix the desired volume and flow of product gas in the counter-current direction through the adsorbers. As shown in a second embodiment in FIG. 5, it also is possible to adjust the pressure equalization rate between adsorbers by adding separate time controlled bi-directional valves 156*ab,* 156*ac,* 156*bc* in lines 152*ab,* 152*bc,* 152*ac* in parallel with each of diverter lines 132*ab,* 132*bc,* 132*ac.* In this second embodiment, each of valves 136 is selectively opened when its corresponding adsorber is being purged, but is closed and the corresponding valve 156 open with corresponding orifices 153*ab,* 153*ac* and 153*bc* of a size to optimize the appropriate pressure equalization steps when purging is complete and the adsorber is being repressurized. Alternatively, the parallel diverter lines 152*ab,* 152*bc,* 152*ac* in the second embodiment may for certain PSA capacities be used to supplement diverter lines 132*ab,* 132*bc,* 132*ac,* in which case valves 136 are not closed during the equalization step, but rather the orifices 153*ab,* 153*ac* and 153*bc* are of a size to supplement flow through purge orifices 140*ab,* 140*ac* and 140*bc* by adding the appropriate amount of additional flow for which of the purge or equalization steps will require the greater flow rate for that PSA design.

Flow control assembly 68, which receives the usable portion of the product gas produced by the three adsorbers A, B, and C, may include a mixing tank 154, a test block component 169, a pressure regulator 170, a conventional flow controller valve 92, check valve 190*a,* a conventional bacteria filter 198 and an outlet connector 100. Mixing tank 154 may be used to average the product gas to the desired concentration. Once through mixing tank 154, the product gas is directed under pressure through line 167 and monitored by pressure regulator 170 until it reaches the flow controller valve 92. The product gas flow rate then is independently controlled by the flow controller valve 92 to proceed through lines 172 and check valve 190*a* to outlet connector 100. Also shown is a check valve 190*b* at which an alternate or supplemental gas supply or pressurized medicant may be attached to the apparatus.

When each adsorber is saturated with nitrogen, the valve sequence operates to first close its respective feed valve 116 to cause a drop in pressure in, or depressurization of, the adsorber as the balance of the generated product gas exits that adsorber. Once partially depressurized, the waste or exit valve 120 for that adsorber is opened, and part of the product gas produced in another of the inactive adsorbers in a repressurized state is then caused by the appropriate valve sequences to flow in the countercurrent direction to purge the first adsorber, in order to again condition the first adsorber to produce oxygen concentrated product gas in the appropriate sequence in the next cycle of operation.

As will now be evident to those skilled in the art, each adsorber A, B and C comprises a substantially elongated vessel attached to a suitable support structure and has an interior cavity which is substantially filled with a bed of adsorption material adapted to adsorb nitrogen from air routed therethrough. Furthermore, the inlets 82*a,* 82*b,* 82*c* and outlets 84*a,* 84*b,* 84*c,* respectively, of each adsorber are in flow communication with each other through the bed of adsorption material. Hence, the feed stream of air directed into each adsorber inlet 82 in the co-current direction is exposed to the adsorption material, by which nitrogen in the air is adsorbed. To regenerate the adsorber, diverted product gas flowing in the counter-current direction (downward as shown in FIG. 1) causes the adsorbed nitrogen to be released by the adsorption material and be discharged to the atmosphere from the corresponding adsorber through its respective inlet 82 and corresponding discharge line 90*a,* 90*b,* 90*c* when its waste valve 120*a,* 120*b,* 120*c* is opened.

The adsorption beds of the adsorbers A, B, and C may be comprised of any of a number of suitable adsorbent materials, such as a molecular sieve material known as sodium alumina silicate with, for example, a bead size of 20/40 mesh. Characteristically, the type and quantity of the adsorbent material are selected to adsorb the appropriate amount of nitrogen from the air processed in the corresponding adsorber A, B, and C in order to produce the product oxygen gas in the desired concentration.

In the embodiments shown, each of the adsorber beds for a medical application may be about 10.0 inches in length and 3.0 inches in diameter, with the sieve material weighing about 649 grams each. Preferably, the beds are spring biased in order not to "fluidize" as the beds are in their depressurization or pressure equalization stages. The feed stream of air is provided at about 1.071 scfm, and the orifice openings in the purge lines are set to about 0.052 inches. As can be seen, when a respective purge control valve 136*ab,* 136*ac,* or 136*bc* is open, a "power purge" phase is initiated for the adsorber A, B, or C receiving output gas from another of the adsorbers, and the size of the orifice will determine the rate of pressure equalization of the beds affected by the open purge valve. Alternately, it may be possible to properly size the seats of the purge valves 136 so as to function as both the purge valve and the purge orifice, and in the case of the embodiment of FIG. 5, also to properly size valves 156 to eliminate the orifices 153.

As indicated earlier, it is known to use PSA apparatus for medical uses with two adsorber beds, in which only one of the adsorbers performs adsorption at any one time while the other adsorber undergoes regeneration. Because such apparatus for medical uses are in many circumstances either too large or not sufficiently quiet, we have solved the problem by the introduction of a third adsorber bed and inventing a correct sequence and timing, as shown in FIGS. 2 and 3, of a minimum of operating valves and control orifices to enable the use of three smaller sized beds.

Figure 2B:
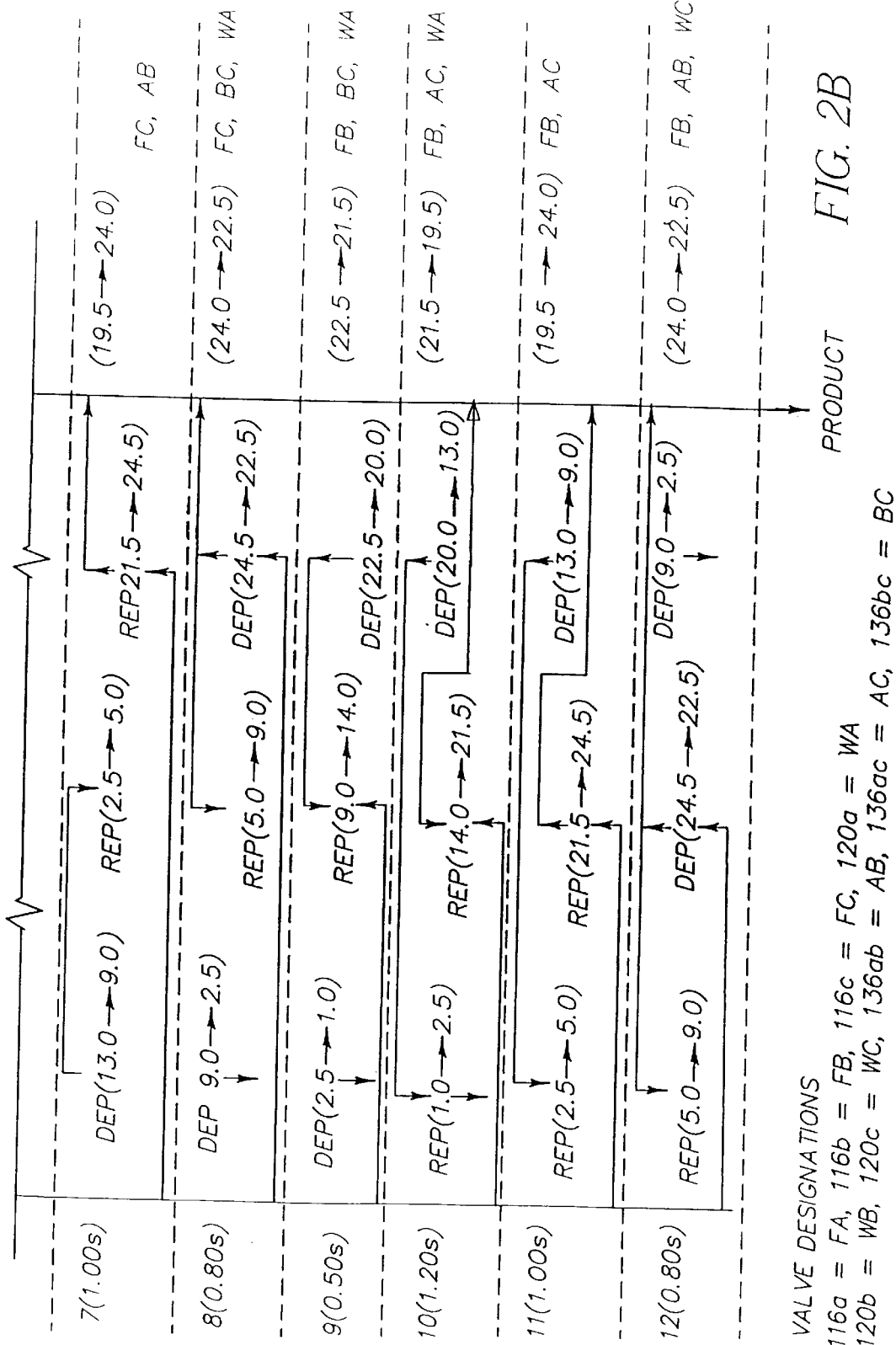
Figure 3:
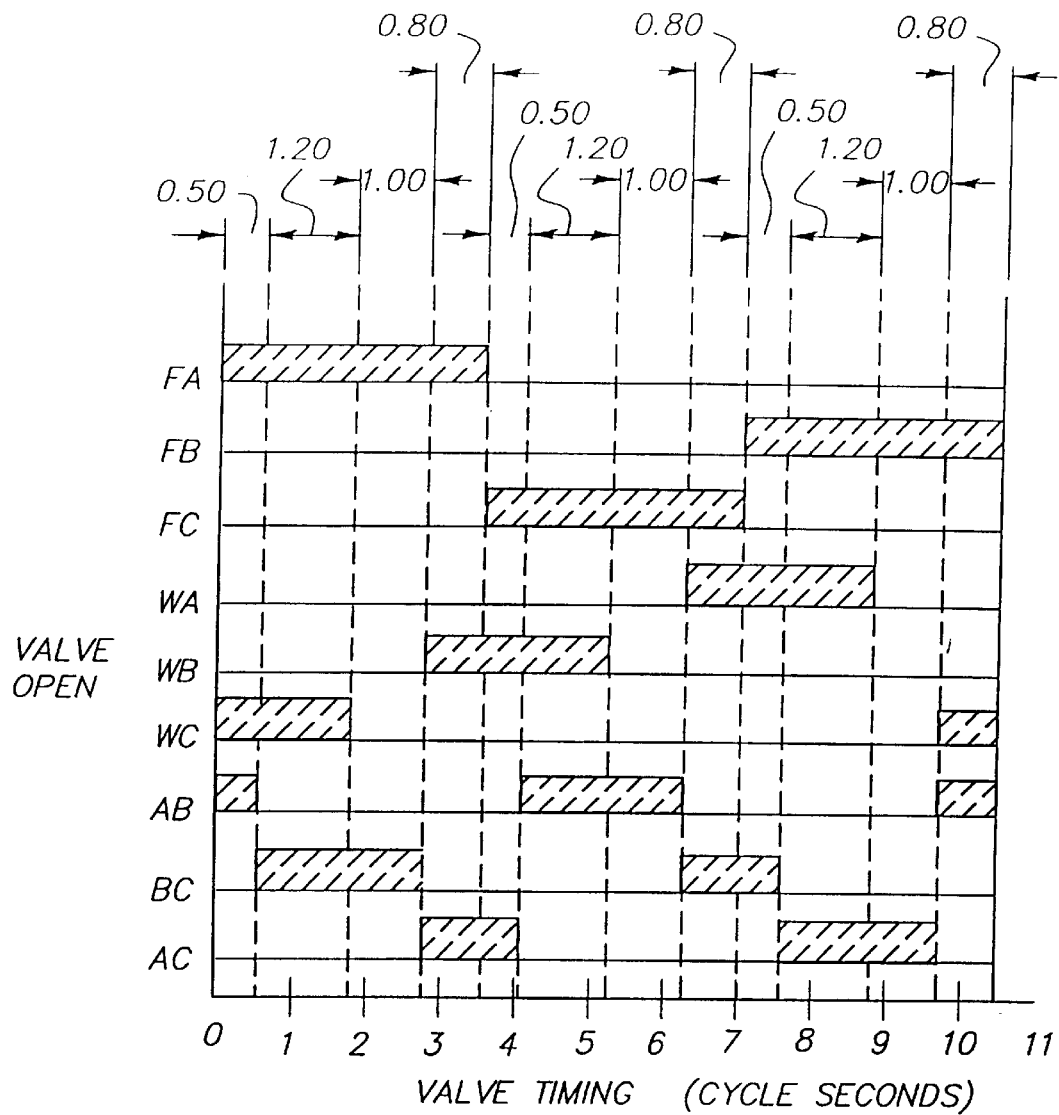
FIG. 3 is a chart showing the timing of the valves used to control the operation of a PSA apparatus according to the invention.

As shown by FIG. 2, a three bed PSA apparatus according to our invention is operated to provide about 3 liters per minute of about 93% oxygen concentrated gas in operating cycles of twelve sequential steps each. In each such cycle, step 1 (as shown to be about 0.5 sec. long), takes place with valves 116a, 136ab and 120c being open. During step 1, adsorber A is being repressurized from about 9 psi to about 14 psi, both by diverted product gas of higher pressure delivered in the counter-current direction from adsorber B and by the feed stream in the co-current direction from line 114a. At the same time, with feed valve 116b being closed and no further feed stream air being provided to adsorber B through closed valve 116b, adsorber B is in the process of being de-pressurized from about 22.5 psi to about 20 psi. At the same time and with waste valve 120c being open, adsorber C (which earlier began its depressurization after having delivered product gas from an earlier cycle) is in the process of completing its depressurization from about 2.5 psi to about 1.0 psi.

In the next step 2, about 1.20 seconds in length and according to the invention, valves 116a, 136bc and 120c are open. By this valve sequence, active adsorber A continues to repressurize to about 21.5 psi while it begins to supply product gas to line 150, and at substantially the same time, inactive adsorber B is being depressurized through adsorber C in which the remaining product gas from adsorber B is diverted to adsorber C through valve 136bc to flow in the counter current direction through adsorber C to purge and discharge the previously adsorbed nitrogen in adsorber C. From this step 2, it can be seen that delivery of product gas is delayed until a higher pressure is achieved, which results in an even more consistent purity in the product gas.

In step 3, for about 1.0 second, discharge valve 120c is closed. Adsorber A continues to supply product gas while adsorber B continues its depressurization to about 9.0 psi and continues to supply product gas to adsorber C to repressurize adsorber C to about 5.0 psi.

In step 4, for about 0.8 seconds, with valves 116a, 136ac and 120b being open, adsorber A continues to supply product gas to line 150 while some of that gas now is diverted to adsorber C to continue repressurization of the latter. With only valve 120b open for adsorber B, some of the remaining gases in adsorber B are discharged through valve 120b to reduce its internal pressure to about 2.5 psi.

As can now be seen, during the first four steps of the operating cycle, adsorber A is the active adsorber principally to supply the product gas, inactive adsorber B is used principally to purge nitrogen from and repressurize inactive adsorber C while adsorber C completes its purge cycle and begins to repressurize.

Similarly, in steps 5 through 8, and in the same sequence of timed steps and corresponding valve openings, adsorber C is the active adsorber principally supplying the product gas to output line 150, while the remaining product gas in the pressurized and now inactive adsorber A is diverted to adsorber B to purge adsorber B of its adsorbed nitrogen and begin repressurization of the latter.

In the final steps 9 through 12, again with similar times and corresponding valve sequences, adsorber B is the active adsorber, pressurized gas from now inactive adsorber C is diverted in the countercurrent direction to purge inactive adsorber A and begin repressurization of the latter.

The sequence of twelve steps is then repeated through continued cycles of operation of the apparatus.

Figure 4:
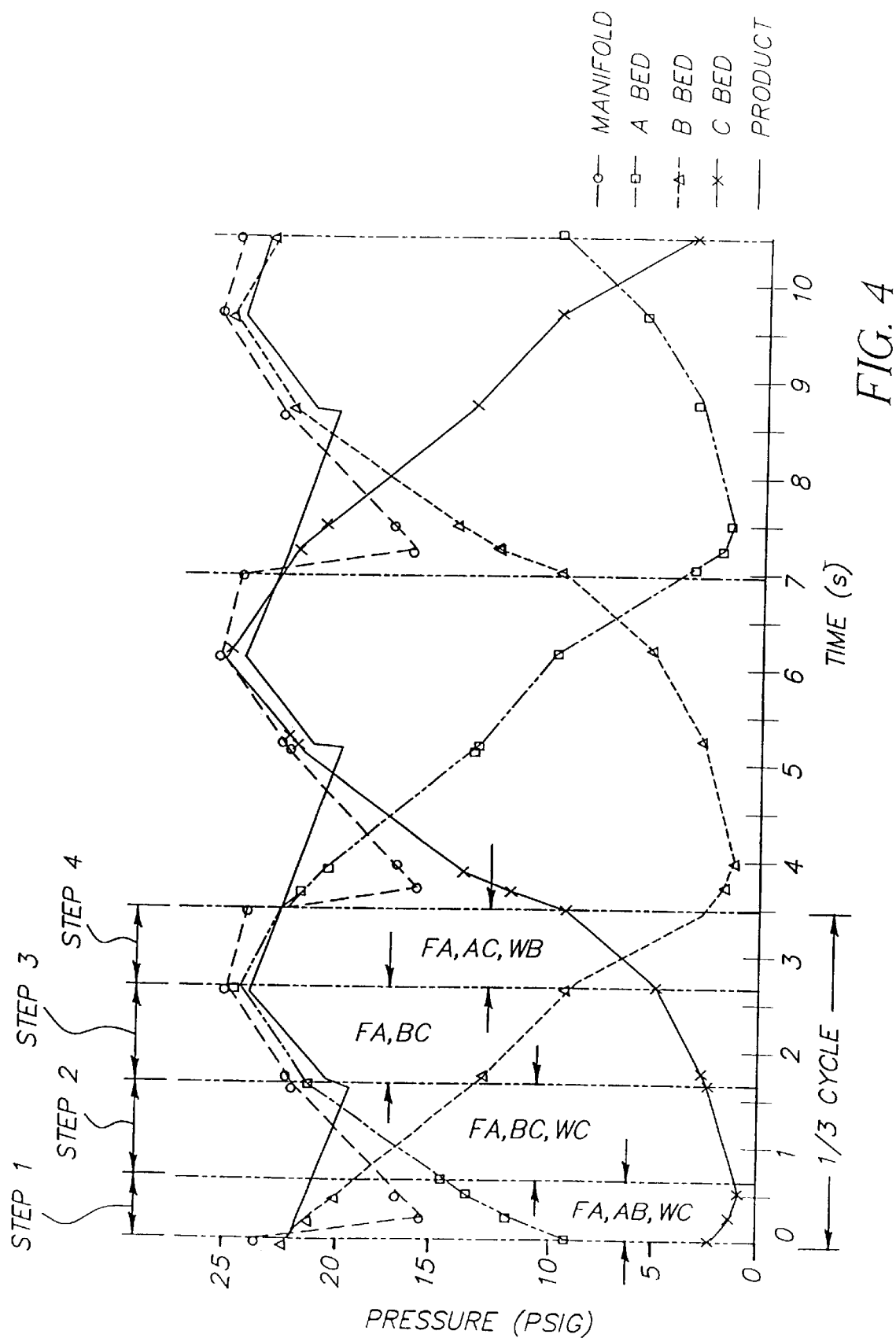
FIG. 4 is a graph showing the relevant pressure changes through the operating cycle of the apparatus of FIG. 1.

FIG. 3 is another illustration of the timed sequence of valve openings (shown in black) for the various valves used to control the three bed PSA apparatus according to our invention. FIG. 4 in turn illustrates the changes in pressure in each of the adsorbers A, B and C during the twelve step cycle, as well as the operable pressures in the feed stream supply line 107 attest point 124 and of the product gas in flow controller 68 at test point 169 before regulator 170.

As can be seen from FIGS. 2 and 4, the preferred embodiment, when operating at about 3 liters per minute (lpm) will result in product gas of about 93% oxygen concentration being delivered from the three adsorbers to control assembly 68 under a pressure of at least about 19 psi and as high as about 24 psi. As such, at least about 43–45% of the oxygen in the ambient air feed stream can be recovered for the product gas, whereas a typical 2-bed oxygen concentrator will recover only about 30–35% of the supplied oxygen from air. The increased efficiency is in part possible because the adsorbers in our 3-bed system are able to depressurize at about 9 psi, while a typical 2-bed system requires at least about 18 psi to depressurize. The energy efficiency is increased even further because the lower depressurization pressure requires only a smaller sound silencer. Moreover, a typical 2-bed system delivers product gas at only about 13 psi, or as much as about 10 psi less than our 3-bed system.

To provide for higher or lower nominal product flow rates in an oxygen concentrator according to our invention, it is possible to change the physical dimensions of the adsorber beds, i.e., their diameters and lengths, and to adjust the flow rate of the air supply and the sizes of the purge orifices. The operational times for each of the twelve steps in the operating cycles will be correspondingly increased or decreased, but the number of steps in each cycle and the function of each step will remain unchanged. One relevant criteria in determining bed size resides in maintaining a pressure drop of about 1psi across the entire bed length. Thus, it also is possible to construct an oxygen concentrator according to the invention with higher rated outputs, as for example at about 50 psi product delivery pressures used for operating rooms and anesthesia and for use as respirators.

Using the method according to our invention, a PSA apparatus can be constructed for a wide range of purposes and in a wide range of operating parameters and operating atmospheres. It is particularly useful in medical applications because of its efficiency and quiet operation. The range of operation can be at operating pressures having a minimum of less than 10 psi to a maximum of about 100 psi, with cycle times from about 3 seconds to about 3 minutes, and producing a product gas with an oxygen concentration from about 38% to about 96%. The invention also enables the apparatus to be operated at higher pressures which make the adsorber beds even more effective.

It also may be possible to use only two beds in using the method according to the invention, in which the purging gas is provided by a supply tank rather than by an inactive adsorber and the supply tank filled by excess product gas. However, a multiple bed system with three beds will be more efficient by as much as 40% and, as seen in FIG. 4, supply the product gas at a more consistent oxygen concentration throughout the operating cycle, thereby providing a design which can eliminate the need for a mixing tank to average the concentration.

Although the apparatus according to our invention is shown in schematic only, those skilled in the art will be able, from the description of our invention as herein provided, to produce a multiple bed PSA apparatus using conventional fluid, electric and electronic components and controls as are well known in the art. In addition, those skilled in the art will be able to include known visual indicators and safety features common to such apparatus when used for monitored and/or unmonitored medical purposes. If it also is desired to be able to variably control the concentration of oxygen in the product gas, then it also may be possible to incorporate into the invention a set of second adjustable purge loops in parallel with lines 132ab, 132ac and 132bc, not shown but described in U.S. Pat. No. 5,871,564.

Operation of the oxygen concentrator 20 can be understood by reviewing the sequencing of the valving means of the concentrator 20 as illustrated in FIGS. 2 and 3. At start-up of the apparatus, all of valves 116, 120, and 136 are open to eliminate any back pressure and then either left open or closed in the sequence shown in FIG. 3 through a timing mechanism of conventional switches and relay switches printed, e.g., in a programmable circuit (not shown). Each of the feed, waste, and equalization valves is preferably a solenoid-type valve responsive to a turning on or shutting off of power to the valve. Hence, product-producing and regeneration operations are automatically controlled in the concentrator 20 by automatically controlling the amount of time that each of the feed, waste, and equalization valves are opened and closed.

The timing mechanism used to control the valves may be designed using conventional circuitry and switches known to skilled practitioners with power to the compressor, switches and valves provided by a suitable electrical connection, and in case of an emergency, with a back-up battery unit.

As will be apparent hereinafter, the apparatus 20 is specifically described and illustrated in relation to the application of pressure swing adsorption to the fractionation of air to produce an oxygen-rich stream. Hence, the feed stream used for apparatus 20 is compressed atmospheric air. Although the present description is limited to the production of desired concentration of oxygen product gas, it is apparent that skilled practitioners could use this pressure swing adsorption apparatus to produce other product gases as well.

It will be thus understood that various modifications and substitutions may be made to the described embodiments without departing from the spirit of the invention. For example, it is possible to include timed solenoid valves in lines 150a,b,c in lieu of or in addition to check valves 144a,b,c to control the timing and delivery of product gas from each of the adsorbers to line 150. Accordingly, the described embodiment is intended for purposes of illustration and not as a limitation.

What is claimed is:

1. A method of producing a concentrated product gas from a supply gas mixture in a pressure swing adsorption apparatus comprising three adsorber beds, to adsorb at least one constituent gas from the supply gas mixture and in which usable product gas is produced in cycles by steps of feeding the supply gas mixture sequentially in a co-current direction through each of the adsorber beds to adsorb at least a substantial portion of the constituent gas and of purging adsorbed constituent gas by pressurized gas fed in a counter-current direction, the improvement comprising the steps of (a) partially repressurizing each one of the adsorber beds by using pressurized gas from an adsorber bed other than the adsorber bed then producing the usable product gas, after completing in each cycle the step of purging constituent gas adsorbed by the one adsorber bed, and (b) then continuing repressurization of the one adsorber bed by using pressurized product gas from the adsorber bed then producing the usable product gas.

2. The method according to claim 1, in which an oxygen concentrated product gas is produced by the adsorption of nitrogen from ambient air, and each of the three adsorbers cycles through steps in a sequence substantially as shown in FIG. 2.

3. The method according to claim 1, in which the improvement comprises sequentially cycling each one of the adsorber beds through steps of repressurizing the one adsorber bed from a minimum to a maximum pressure first by introducing gas from another adsorber bed and commencing delivery of the product gas only after the one adsorber bed is pressurized to a level intermediate that of the minimum and maximum pressures.

4. The method according to claim 1, in which the step of further continuing the repressurization comprises diverting a portion of the usable product gas when the then producing adsorber bed has substantially reached a maximum pressure, then terminating both the feeding of supply gas to and the delivery of the usable product gas from then producing adsorber bed, and then diverting at least some remaining product gas to the one adsorber bed.

5. The method according to claim 4, and further comprising the step of rediverting the diverted product gas to the remaining adsorber bed, after the one adsorber bed has reached an intermediate pressure, to purge the remaining adsorber bed of adsorbed constituent gas.

6. A method of producing an oxygen concentrated gas from ambient air in a pressure swing adsorption apparatus having three sequentially operating adsorber beds of nitrogen adsorbing material and delivering the oxygen concentrated gas to an outlet of the apparatus, comprising the steps of:

(a) feeding ambient air through a first of the adsorber beds in a co-current direction to adsorb at least a substantial amount of the nitrogen in the ambient air and delivering the balance of the ambient air as an oxygen concentrated product gas to the apparatus outlet, while increasing the gas pressure in the first adsorber bed to an elevated operating pressure;

(b) substantially simultaneously with step (a) directing pressurized product gas from a second of the adsorber beds to be fed in a counter-current direction through the third of the adsorber beds first to begin a process of repressurizing the third adsorber bed while the second adsorber bed is depressurizing and while a step of purging adsorbed nitrogen from the third adsorber bed is being completed, and then continuing the process of repressurizing the third adsorber bed with product gas from the second adsorber bed and after the step of purging adsorbed nitrogen from the third adsorber bed is terminated;

(c) then permitting the first adsorber bed to begin depressurization from an elevated operating pressure while continuing to deliver product gas from the first adsorber bed to the apparatus outlet but diverting a portion of the product gas from the first adsorber bed to the third adsorber bed to continue repressurization of the third adsorber bed;

(d) substantially simultaneously with step (c) continuing the depressurization of the second adsorber bed while causing nitrogen adsorbed in the second adsorber bed to be purged and discharged from the apparatus;

(e) then feeding ambient air through the third adsorber bed in the co-current direction to adsorb at least a substantial amount of the nitrogen in the ambient air and delivering the balance of the ambient air as an oxygen concentrated product gas to the apparatus outlet, while increasing the gas pressure in the third adsorber bed to an elevated operating pressure;

(f) substantially simultaneously with step (e) directing pressurized product gas from the first adsorber bed to be fed in a counter-current direction through the second adsorber bed to begin a process of repressurizing the second adsorber bed while the first adsorber bed is depressurizing and while the step of purging adsorbed nitrogen from the second adsorber bed is being completed, and then continuing the process of repressurizing the second adsorber bed with product gas from the first adsorber bed and after the step of purging adsorbed nitrogen from the second adsorber bed is terminated;

(g) then permitting the third adsorber bed to begin depressurization from the elevated operating pressure while continuing to deliver product gas from the third adsorber bed to the apparatus outlet but diverting a portion of the product gas from the third adsorber bed to the second adsorber bed to continue repressurization of the second adsorber bed;

(h) substantially simultaneously with step (g) continuing the depressurization of the first adsorber bed while causing nitrogen adsorbed in the first adsorber bed to be purged and discharged from the apparatus;

(i) then feeding ambient air through the second adsorber bed in the co-current direction to adsorb at least a substantial amount of the nitrogen in the ambient air and delivering the balance of the ambient air as an oxygen concentrated product gas to the apparatus outlet, while increasing the gas pressure in the second adsorber bed to an elevated operating pressure;

(j) substantially simultaneously with step (i) directing pressurized product gas from the third adsorber bed to be fed in a counter-current direction through the first adsorber bed to begin a process of repressurizing the first adsorber bed while the third adsorber bed is depressurizing and while the step of purging adsorbed nitrogen from the first adsorber bed is being completed, and then continuing the process of repressurizing the first adsorber bed with product gas from the third adsorber bed and after the step of purging adsorbed nitrogen from the first adsorber bed is terminated;

(k) then permitting the second adsorber bed to begin depressurization from the elevated operating pressure while continuing to deliver product gas from the second adsorber bed to the apparatus outlet but diverting a portion of the product gas from the second adsorber bed to the first adsorber bed to continue repressurization of the first adsorber bed;

(l) substantially simultaneously with step (g) continuing the depressurization of the third adsorber bed while causing nitrogen adsorbed in the third adsorber bed to be purged and discharged from the apparatus; and (m) then repeating steps (a) through (l) as needed to continue the delivery of product gas to the apparatus outlet.

7. A multiple bed pressure swing adsorption apparatus for producing a concentrated product gas from a gaseous mixture and comprising:

(a) three adsorbers each having means for adsorbing at least one constituent gas from the gaseous mixture to produce a product gas from the remainder of the gaseous mixture;

(b) means for sequentially pressurizing and depressurizing each of the adsorbers;

(c) valve means fluidly connected to each of the adsorbers for feeding the gaseous mixture in a co-current direction alternately to each of the adsorbers while pressurized to produce the product gas by adsorption of at least a substantial portion of the constituent gas and then for purging the adsorbed constituent gas from each adsorber while being depressurized;

(d) means for delivering a substantial portion of the product gas from the then producing adsorber to an outlet in the apparatus;

(e) means fluidly connecting the adsorbers for diverting a predetermined portion of product gas from one of the non-producing adsorbers to flow in a counter-current direction through the other of the non-producing adsorbers, first to complete a step of purging from the other non-producing adsorber the one constituent gas adsorbed by the other non-producing adsorber and then to partially repressurize of the other non-producing adsorber after termination of the purging step;

(f) means fluidly connected to the adsorbers for selectively sequencing the movement of the gaseous mixture through the adsorbers and for selectively directing the product gas to the outlet and/or the diverting means; and (g) wherein each adsorber comprises an outlet for the product gas and the means for delivering the substantial portion of the product gas comprises separate check valve means at the outlet of each adsorber for enabling product gas to be delivered only when a predetermined pressure is reached.

8. The pressure swing adsorption apparatus of claim 7 wherein the separate check valve means for each one adsorber further prevents product gas from the other adsorbers to back flow into the one adsorber.

9. The pressure swing adsorption apparatus of claim 7 wherein the diverting means includes means for diverting pressurized gas from each adsorber to another of the adsorbers to at least partially equalize the pressures within the two adsorbers.

10. The pressure swing adsorption apparatus of claim 9 wherein the diverting means comprises a first fluid path fluidly connecting the adsorbers and sized to substantially optimize purging of the adsorbed constituent gas, and a second fluid path fluidly connecting the adsorbers and sized to substantially optimize the pressure equalization.

11. A multiple bed pressure swing adsorption apparatus for producing a concentrated product gas from a gaseous mixture and comprising:

(a) three adsorbers each having means for adsorbing at least one constituent gas from the gaseous mixture to produce a product gas from the remainder of the gaseous mixture;

(b) means for sequentially pressurizing and depressurizing each of the adsorbers;

(c) valve means fluidly connected to each of the adsorbers for feeding the gaseous mixture in a co-current direction alternately to each of the adsorbers while pressurized to produce the product gas by adsorption of at least a substantial portion of the constituent gas and then for purging the adsorbed constituent gas from each adsorber while being depressurized;

(d) means for delivering a substantial portion of the product gas from the then producing adsorber to an outlet in the apparatus;

(e) means fluidly connecting the adsorbers for diverting a predetermined portion of product gas from one of the non-producing adsorbers to flow in a counter-current direction through the other of the non-producing adsorbers, first to complete a step of purging from the other non-producing adsorber the one constituent gas adsorbed by the other non-producing adsorber and then to partially repressurize of the other non-producing adsorber after termination of the purging step;

(f) means fluidly connected to the adsorbers for selectively sequencing the movement of the gaseous mixture through the adsorbers and for selectively directing the product gas to the outlet and/or the diverting means; and (g) wherein the diverting means comprises valves that are controlled to be open in the sequence substantially as shown in FIG. 3.

12. The pressure swing adsorption apparatus of claim 11 wherein the diverting means comprises valves that are controlled to be open for the times substantially as shown in FIG. 3.

13. A multiple bed pressure swing adsorption apparatus for producing a concentrated product gas from a gaseous mixture and comprising:

(a) three adsorbers each having means for adsorbing at least one constituent gas from the gaseous mixture to produce a product gas from the remainder of the gaseous mixture;

(b) means for sequentially pressurizing and depressurizing each of the adsorbers;

(c) valve means fluidly connected to each of the adsorbers for feeding the gaseous mixture in a co-current direction alternately to each of the adsorbers while pressurized to produce the product gas by adsorption of at least a substantial portion of the constituent gas and then for purging the adsorbed constituent gas from each adsorber while being depressurized;

(d) means for delivering a substantial portion of the product gas from the then producing adsorber to an outlet in the apparatus;

(e) means fluidly connecting the adsorbers for diverting a predetermined portion of product gas from one of the non-producing adsorbers to flow in a counter-current direction through the other of the non-producing adsorbers, first to complete a step of purging from the other non-producing adsorber the one constituent gas adsorbed by the other non-producing adsorber and then to partially repressurize of the other non-producing adsorber after termination of the purging step;

(f) means fluidly connected to the adsorbers for selectively sequencing the movement of the gaseous mixture through the adsorbers and for selectively directing the product gas to the outlet and/or the diverting means; and (g) wherein the gaseous mixture comprises ambient air for producing an oxygen concentrated gas for medical use, the three adsorbers each to adsorb nitrogen from the ambient air, the three adsorbers being controlled to produce the oxygen concentrated gas and to be purged of adsorbed nitrogen, in the cycle and sequence of steps substantially as shown in FIG. 2.

14. The pressure swing adsorption apparatus of claim 13 which the oxygen concentrated gas is produced at a rate of at least about 3 lpm and has a concentration of over about 90% oxygen.

* * * * *